United States Patent
Aldigeri

(10) Patent No.: US 8,794,954 B2
(45) Date of Patent: Aug. 5, 2014

(54) APPARATUS FOR TRANSFERRING OBJECTS

(75) Inventor: Gianluca Aldigeri, Bagnacavallo (IT)

(73) Assignee: Sacmi Cooperativa Meccanici Imola Societa' Cooperativa (IT)

( * ) Notice: Subject to any disclaimer, the term of this patent is extended or adjusted under 35 U.S.C. 154(b) by 201 days.

(21) Appl. No.: 13/384,969

(22) PCT Filed: Jul. 22, 2010

(86) PCT No.: PCT/IB2010/053336
§ 371 (c)(1), (2), (4) Date: Mar. 21, 2012

(87) PCT Pub. No.: WO2011/010293
PCT Pub. Date: Jan. 27, 2011

(65) Prior Publication Data
US 2012/0171319 A1  Jul. 5, 2012

(30) Foreign Application Priority Data
Jul. 23, 2009  (IT) .............................. MO2009A0188

(51) Int. Cl.
*B29C 31/00* (2006.01)
*B29C 31/06* (2006.01)

(52) U.S. Cl.
USPC ......... 425/261; 425/297; 425/348 R; 425/809

(58) Field of Classification Search
USPC ....................... 425/261, 297, 348 R, 809, 347
See application file for complete search history.

(56) References Cited

U.S. PATENT DOCUMENTS

| | | | |
|---|---|---|---|
| 5,807,592 A * | 9/1998 | Alieri | 425/347 |
| 6,718,606 B2 * | 4/2004 | Bassi | 425/348 R |
| 7,384,257 B2 * | 6/2008 | Pucci et al. | 425/297 |
| 8,007,266 B2 * | 8/2011 | Parrinello et al. | 425/261 |

FOREIGN PATENT DOCUMENTS

| | | |
|---|---|---|
| DE | 19654350 A1 | 6/1998 |
| WO | 2004096515 A1 | 11/2004 |
| WO | 2008017915 A1 | 2/2008 |

* cited by examiner

*Primary Examiner* — Joseph S Del Sole
*Assistant Examiner* — Thukhanh Nguyen
(74) *Attorney, Agent, or Firm* — Laubscher & Laubscher, P.C.

(57) ABSTRACT

An apparatus for transferring objects (2), in particular caps (2), from a molding carousel (3) on which the caps (2) are molded, to an evacuating device (6), comprises: —a supporting element (11) that is rotatable around a rotation axis (X1) and is suitable for receiving said objects (2) and, —arm means (13) that is rotatable around said rotation axis (X1) and comprising seat means (16) that is suitable for receiving said caps (2); the arm means (13) is movable so as to vary the distance of the arm means (13) from said rotation axis (X1), in particular it is movable radially with respect to the rotation axis (X1) to slide the objects (2) on the supporting element (11).

15 Claims, 5 Drawing Sheets

2

APPARATUS FOR TRANSFERRING OBJECTS

This application is a §371 National Stage entry of PCT International Application No. PCT/IB2010/053336 filed Jul. 22, 2010. PCT/IB2010/053336 claims priority to IT Application No. MO2009A000188 filed Jul. 23, 2009. The entire contents of these applications are incorporated herein by reference.

The invention relates to an apparatus for transferring objects. In particular, the apparatus is able to remove caps that are formed on a machine for moulding plastics and is able to transfer the aforesaid caps to an evacuating device. A transferring device for transferring caps from a rotatable moulding carousel to an evacuating device such as a conveyor belt is known.

The moulding carousel is provided peripherally with a plurality of moulds for compression-moulding doses of plastics for obtaining the caps.

Each mould comprises a die, suitable for receiving a dose of plastics in pasty state, and a punch that is suitable for cooperating with the die to shape the dose so as to obtain a cap.

The transferring device comprises a first transferring carousel that removes the caps from the moulding carousel, and a second transferring carousel that receives the caps from the first transferring carousel to transfer the caps to the conveyor belt. The first transferring carousel and the second transferring carousel each comprise a disc-shape support on which semicircular seats are peripherally obtained, each of which is suitable for receiving a respective cap. Guides are provided that are placed laterally to the first transferring carousel and to the second transferring carousel that guide the caps whilst they are advanced from the moulding carousel to the conveyor belt. The upper surface of the conveyor belt is located at a lower height than the plane on which the caps advance that are conveyed by the second transferring carousel. This is necessary for facilitating the passage of the cap from the second transferring carousel to the conveyor belt, under the effect of the centrifugal action that the rotation of the second transferring carousel exerts on the cap.

The semicircular seats of the first transferring carousel travel along a circular trajectory, which is substantially tangential, in a zone near the moulding carousel, to a further circular trajectory along which the moulds of the moulding carousel move.

During operation, the die and the punch of each mould, at the end of forming a cap, move away from one another to enable the cap to be removed from the moulding carousel. In particular, the cap, once it has been moulded, remains connected to the respective punch by means of undercuts such as an internal thread of the cap, and is subsequently removed from the punch to be housed in a respective semicircular seat of the first transferring carousel. The cap, during rotation of the first transferring carousel, approaches the second transferring carousel until it reaches an exchange position between the first and the second transferring carousel in which it partially interacts with the first transferring carousel and partially with the second transferring carousel. The cap, through the effect of the centrifugal thrust imposed by the first transferring carousel, separates from the first transferring carousel to be positioned in a respective semicircular seat of the second transferring carousel.

Subsequently, the cap is advanced by the second transferring carousel until it is surrendered on the conveyor belt. During transferring from the moulding carousel to the conveyor belt, the caps then advance along an "S"-shaped path.

A drawback of the transferring device disclosed above is that the first transferring carousel and the second transferring carousel define an "S"-shaped advancing path along which the cap is subject to reversals of centrifugal actions that may compromise the correct positioning thereof. In particular, the exchange position is rather critical in which the cap passes from the first transferring carousel to the second transferring carousel. In the exchange position, the cap is subjected both to a reversal of the centrifugal action and to a contact variation. In other words, transitional conditions occur in which the cap is first in contact with the first transferring carousel and respective side guide and is subsequently in contact with the second transferring carousel and respective side guide. The reversal of centrifugal action and the variation of the contact of the cap when moving from the first carousel to the second transferring carousel can lead the cap to jam between the transferring carousel/s and/or the guide/s or they can be raised or overturned, causing undesired jams and machine stoppages. Another drawback is that the difference in level between the second transferring carousel and the conveyor belt, which is necessary for ensuring the passage of the cap from the second transferring carousel to the conveyor belt under the effect of the centrifugal action, can cause the cap to be overturned.

An object of the invention is to improve apparatuses for transferring objects.

Another object of the invention is to obtain an apparatus that may be able to transfer objects, in particular caps, by significantly reducing the risk that the caps get overturned or assume undesired positions.

According to the invention, there is provided an apparatus for transferring objects as defined in claim 1.

The invention can be better understood and implemented with reference to the attached drawings that illustrate an embodiment thereof by way of non-limiting example, in which.

Figure 1:
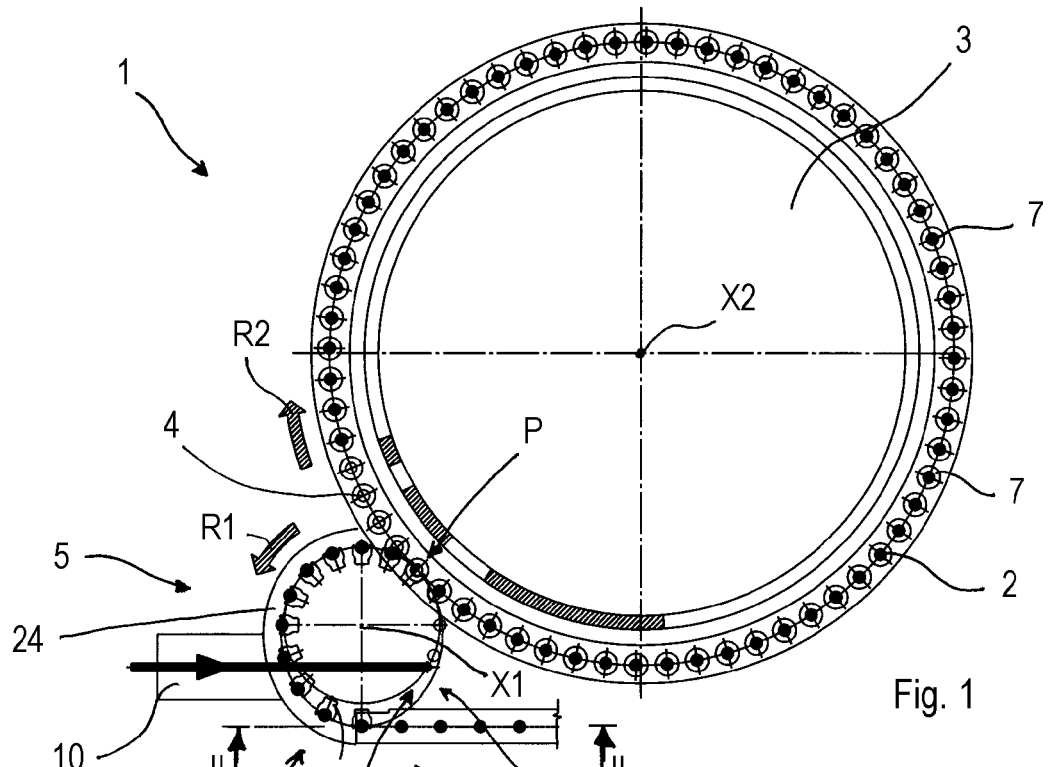
FIG. 1 is a plan view that shows a carousel for moulding caps and an apparatus for transferring caps from the moulding carousel to an evacuating device.

With reference to FIG. 1, a production line 1 for producing objects, in particular caps 2 made of plastics, is disclosed.

The production line 1 comprises a moulding carousel 3 for moulding objects made of plastics.

In particular, the moulding carousel 3 is configured for compression-moulding doses 4 (shown in FIG. 1) of plastics for obtaining caps 2. The plastics used may comprise, for example, polyethyleneterephthalate (PET), polypropylene (PP), polyvinyl chloride (PVC), high-density polyethylene (HDPE), polyethylene naphthalate (PEN), polystyrene (PS), polylactic acid (PLA).

An apparatus is provided for transferring caps 2, the apparatus comprising a transferring carousel 5 that is suitable for removing the caps 2 from the moulding carousel 3 and transferring the caps 2 to an evacuating device, such as a conveyor belt 6.

The transferring carousel 5 is rotatable around a rotation axis X1 and rotates in a first rotation direction R1. The moulding carousel 3 is rotatable around a further rotation axis X2 that is substantially vertical and parallel to the rotation axis X1 and rotates in a second rotation direction R2, opposite the first rotation direction R1.

The moulding carousel 3 is provided peripherally with a plurality of moulds 7 for compression-moulding the doses 4 of plastics for obtaining the caps 2. The moulds 7 can be distributed angularly on the moulding carousel 3 in a uniform manner.

Each mould 7 comprises a die 8, i.e. a female mould part, and a punch 9, i.e. a male mould part. In each die 8 a forming cavity is obtained. Each forming cavity is defined internally by a first forming surface, configured for shaping outer surfaces of a cap 2. The punch 7 externally comprises a second forming surface configured for shaping internal surfaces of a cap 2.

Each die 8 and the respective punch 9 are mutually movable along a moulding direction S parallel to the further rotation axis X2 of the moulding carousel 3. Each die 8 and the respective punch 9 move away from one another to enable a dose 4 to be inserted into the mould 7. The die 8 and the respective punch 9 subsequently approach one another to shape the dose 4 and generate the cap 2.

Figure 3:
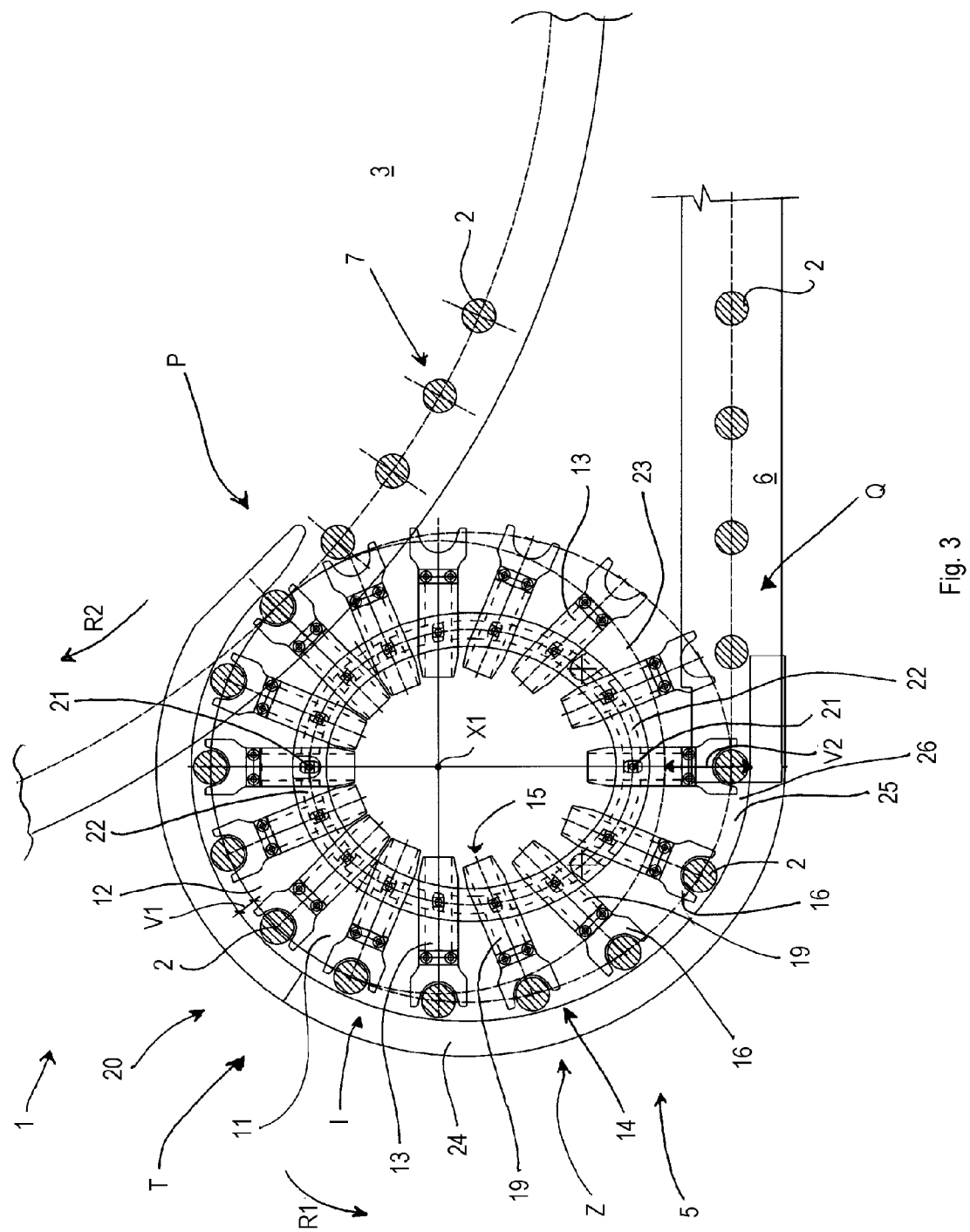
FIG. 3 is a plan view of the apparatus for transferring caps in FIG. 1.
Figure 4:
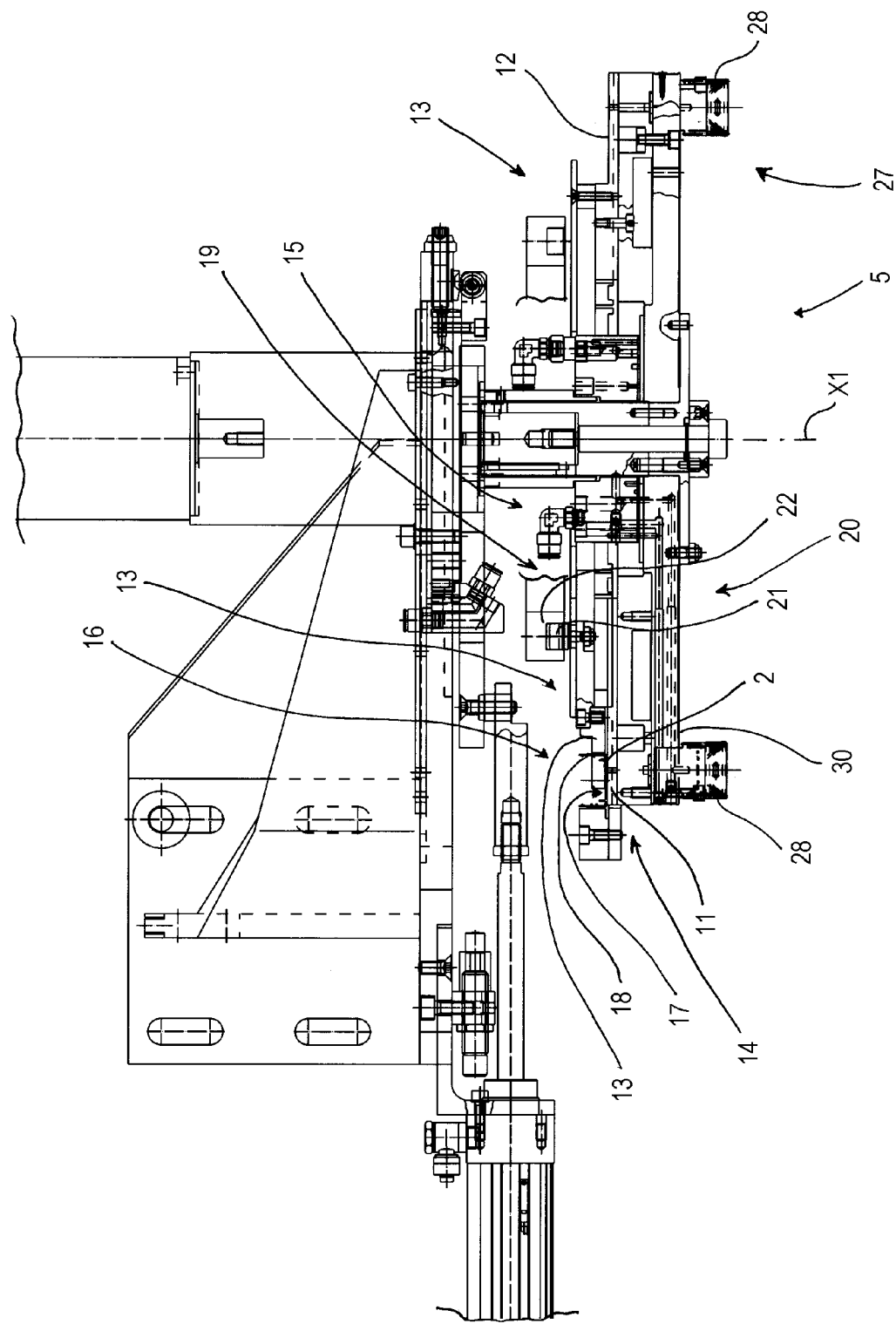
FIG. 4 is a partially sectioned and fragmentary front view of the apparatus for transferring caps.
Figure 5:
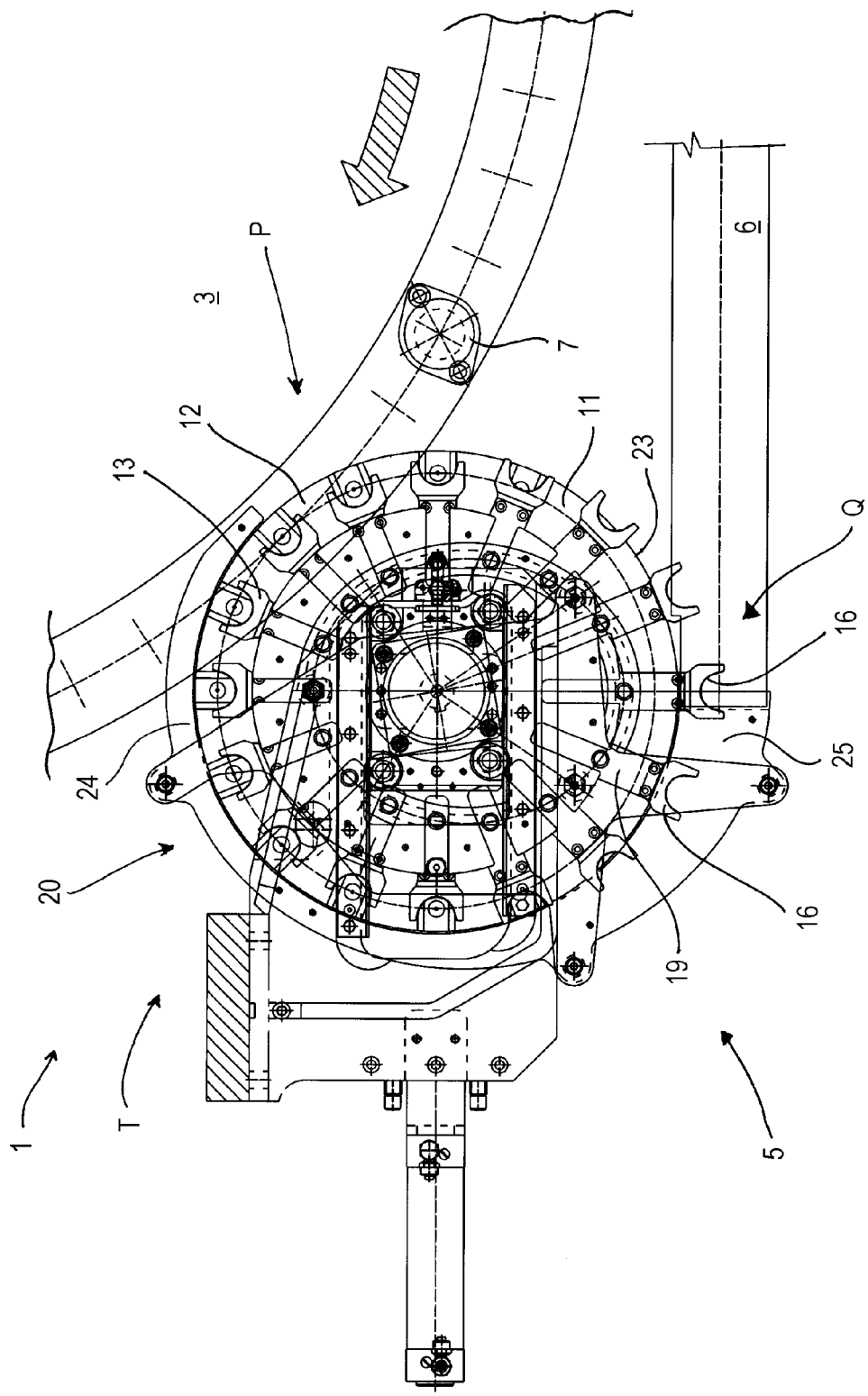
FIG. 5 is a further plan view of the apparatus for transferring caps of FIG. 1.
Figure 6:
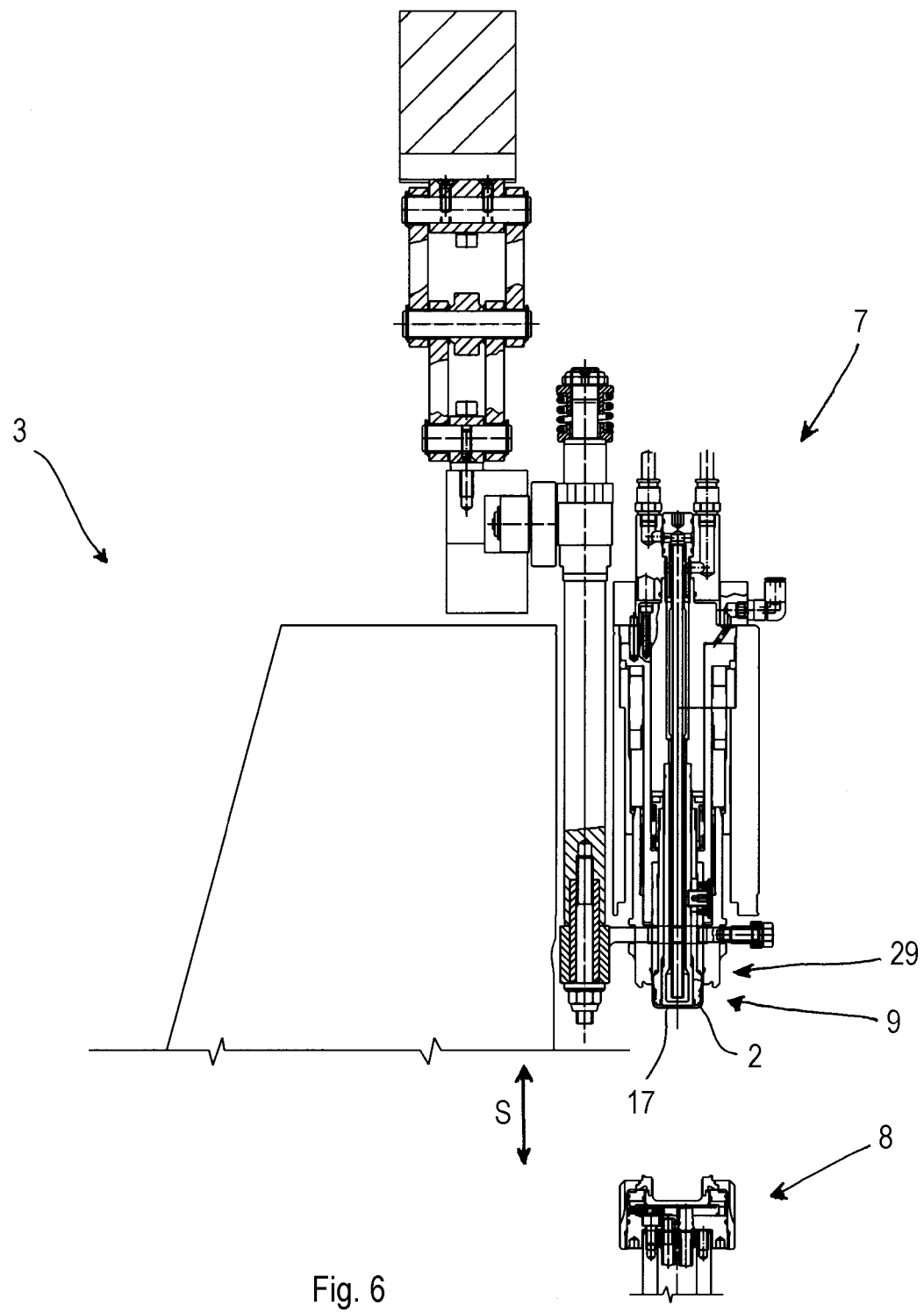
FIG. 6 shows a mould of the moulding carousel.

The transferring carousel 5, better shown in FIGS. 3, 4 and 5, comprises a supporting element 11 that is rotatable around the rotation axis X1 and is configured for restingly receiving the caps 2. The supporting element 11 comprises a resting surface 12 that is suitable for restingly receiving base portions or transverse walls 17 of the caps 2. The resting surface 12 is smooth to enable caps 2 to slide easily with respect thereto, as will be disclosed below.

In particular, the supporting element 11 can have a disc shape. The supporting element 11 is peripherally bounded by an edge 23.

The transferring carousel 5 comprises a plurality of transferring arms 13. The transferring arms 13 extend radially to the rotation axis X1.

The transferring arms 13 are arranged substantially parallel to the resting surface 12 and near the latter. In particular, the transferring arms 13 are connected to the transferring carousel 5 so as to be movable with respect to the supporting element 11, as will be disclosed better further on. Each transferring arm 13 is placed at a greater height than the resting surface 12.

Each transferring arm 13 comprises an elongated body 19 having a first end 14, further from the rotation axis X1, and a second end 15, opposite the first end 14 and arranged nearer the rotation axis X1.

Each transferring arm 13, in the first end 14, is provided with a seat element 16 that is configured as a "C" or as a fork, which is suitable for receiving at least part of a cap 2. In particular, the seat element 16 is configured for receiving at least part of a side wall 18 of a cap 2. Owing to the seat element 16 that is thus configured it is possible to obtain a correct and precise positioning of each cap 2 on the transferring carousel 5. In particular, each seat element 16 has the function of maintaining a correct position of the respective cap 2 with respect to the supporting element 11 on which the cap 2 rests. Whilst the supporting element 11 supports the caps 2 below, the seat elements 16 interact with side zones of the caps 2, so as to prevent the caps 2 from moving on the supporting element 11 in a circumferal direction with respect to the latter.

The transferring arms 13 are configured for moving with respect to the supporting element 11. In particular, each transferring arm 13 is radially movable to move towards and away from the rotation axis X1.

The transferring carousel 5, in one embodiment, is provided with a driving device 20 that varies the distance of each arm 13 from the rotation axis X1. The driving device 20 may comprise roller elements 21, each connected to the elongated body 19 of each transferring arm 13, the roller elements 21 being configured for interacting with a stationary cam profile 22. The cam profile 22 comprises zones placed at different distances from the rotation axis X1, so as to vary the radial position of each roller element 21, and thus of the respective transferring arm 13, in function of the angular position that the latter assumes during rotation of the transferring carousel 5. In the disclosed embodiment, the cam profile 22 has an oval plan shape.

Each transferring arm 13 assumes positions that are more retracted when it is near the moulding carousel 3, in particular, near a removing zone P in which a cap 2 is received and removed. Each transferring arm 13 assumes positions that are more extended with respect to the rotation axis X1 when it is near the conveyor belt 6, in particular, near a delivery zone Q in which the caps 2 are delivered to the conveyor belt 6.

A transferring path T is thus defined that extends from the removing zone P to the delivery zone Q, along which the caps 2 are advanced.

The driving device 20 is configured so as to project the seat elements 16 progressively to the outside of the supporting element 11 as the transferring arms 13 approach the delivery zone Q. In particular, near the delivery zone Q, the seat elements 16 protrude outside the supporting element 11 beyond the edge 23.

The transferring carousel 5 comprises a side guide 24 that extends around the supporting element 11 from a region near the removing zone P to a further region near the delivery zone Q. The side guide 24 is stationary and cooperates with the seat elements 16 and with the supporting element 11 to guide the caps 2 laterally during transferring from the removing zone P to the delivery zone Q. In particular, the side guide 24 guides the caps 2 laterally, maintaining the caps on the transferring carousel 5. Owing to the supporting element 11, to the side guide 24 and to the seat elements 16, correct positioning of the caps 2 is obtained during transferring of the caps 2 from the moulding carousel 3 to the conveyor belt 6. In this manner, it is prevented that the caps 2 assume undesired positions that may cause obstructions or falls of the caps outside the production line, as may occur in the prior art.

In one embodiment, the distance of the side guide 24 from the edge 23 of the supporting element 11 is maintained substantially equal to a first value V1 for a portion of path that extends approximately from the removing zone P to an intermediate zone I (shown in FIG. 3) of the transferring path T.

The distance of the side guide 24 from the edge 23 varies in a portion of the transferring path T that extends from the intermediate zone I to near the delivery zone Q. In particular, the aforesaid distance increases progressively, moving from the first value V1 to a second value V2 that is near the delivery zone Q, as shown in FIG. 3.

The radial driving of the transferring arms 13 can be such that the seat elements 16, once the respective caps 2 have been received, are maintained at a distance from the side guide 24 that is substantially constant along a substantial part of the path from the removing zone P to the delivery zone Q.

A flat supporting guide 25 is provided, comprising a supporting surface 26 that is substantially parallel to the resting surface 12 of the supporting element 11.

In particular, the supporting surface 26 can be at a height that is substantially equal to the height of the resting surface 12 or be inferior to the latter.

The supporting guide 25 extends approximately between the side guide 24 and the edge 23 of the supporting element 11 and comprises a region that extends from the intermediate zone I to the delivery zone Q.

The supporting guide 25 has a dimension, measured in a radial direction with respect to the rotation axis X1, which increases progressively from the intermediate zone I of the transferring path T to the delivery zone Q.

The resting surface 12 of the supporting element 11 and the supporting surface 26 of the supporting guide 25 together define a plane on which the caps 2 are advanced.

Figure 2:
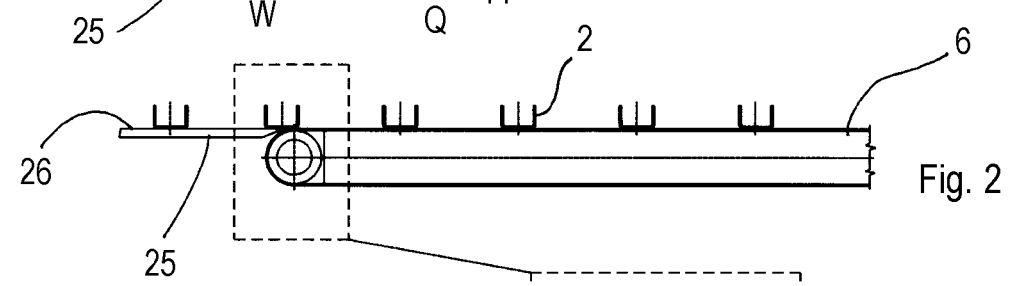
FIG. 2 is a fragmentary section taken along the plane II-II of FIG. 1.
Figure 2A:
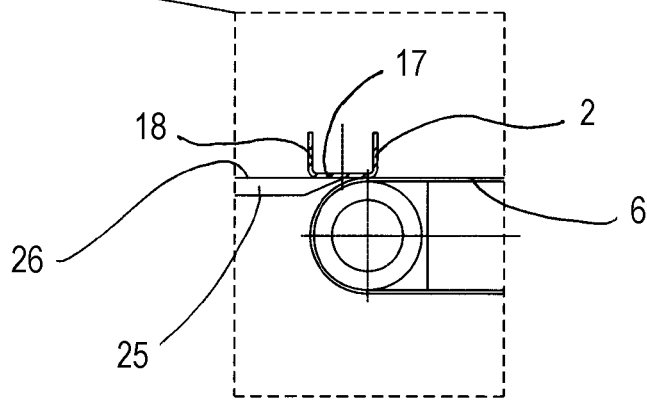
FIG. 2a shows an enlarged detail of FIG. 2.

Near the delivery zone Q, the supporting surface 26 is at a height that is substantially equal to or greater than the height at which the conveyor belt 6 is located, as visible in FIG. 2a. The supporting surface 26 is configured so as to enable the caps 2 to slide gently, passing from the supporting guide 25 to the conveyor belt 6.

Owing to the transferring carousel 5 that is thus configured, the caps 2 can be transferred in a reliable and secure manner. The caps 2 are not subject to reversals of centrifugal actions, as occurs, on the other hand, in the prior art. Further, owing to the transferring carousel 5 the caps 2 can advance along a path that is simplified with respect to the "S"-shaped path of the prior art. In this manner, the risk is significantly reduced that jams will be generated owing to incorrect positioning of the caps 2.

The production line 1 comprises an extruder 10 that is suitable for dispensing a flow of plastics from which the doses 4 are separated. The extruder 10 comprises an extruding mouth from which the flow of plastics exits in a vertical upward direction. The extruding mouth is positioned upstream of the removing zone P of the caps 2, with respect to the rotation direction R1 of the transferring carousel 5 and in an extrusion zone W placed between the conveyor belt 6 and the removing zone P.

With reference to FIG. 4, a removing and supplying device 27 is provided for supplying the moulds 7 with the doses 4 of plastics. The removing and supplying device 27 is configured for cutting suitable doses 4 from the flow of plastics exiting the extruding mouth and for transferring the doses sequentially to respective dies 8.

In the disclosed embodiment, the removing and supplying device 27 is incorporated onto the transferring carousel 5. In particular, the removing and supplying device 27 comprises removing and supplying elements 28 that project downwards from a lower surface 30 of the transferring carousel 5. The removing and supplying elements may comprise C-shaped elements 28 that are moved along a circular path. The C-shaped elements 28 have a cavity facing the direction in which they advance during rotation of the transferring carousel 5. During operation, the plastics dispensed by the extruding mouth are intercepted in sequence by the C-shaped elements 28. As the plastics flow outside they expand and remain blocked through friction in a respective C-shaped element 28 that, via a cutting action, separates a fraction thereof that gives origin to a dose 4.

Whilst the upper part of the transferring carousel 5 receives a cap 2, a dose 4, supported in the lower part of the transferring carousel 5, is released by the respective C-shaped element 28 to supply a die 8. For this purpose, the removing and supplying device 27 may comprise piston elements, each suitable for pushing the dose 4 to separate the dose from the C-shaped element 28 and insert the dose into the die 8 underneath.

The passage of the dose 4 from the C-shaped element 28 to the die 8 underneath occurs in a zone that may be a tangential zone between the circular path of the moulds 7 and the further circular path of the C-shaped elements 28, or a partial overlap zone between the circular path and the further circular path, or a minimum distance zone between the circular path and the further circular path.

How the transfer of the caps 2 from the moulding carousel 3 to the conveyor belt 6 occurs will now be disclosed.

During operation, a cap 2, once it has been moulded, is extracted from the respective mould 7. An extracting device 29 is provided, such as a ring or sleeve element that is movable axially with respect to the punch 9, that separates the cap 2 from the punch 8 to which the cap 2, after forming, remains connected by means of the undercuts.

The extracting device 29 acts in a manner such that the cap 2 rests on the supporting element 11 and is received into a respective seat element 16, in the removing zone P.

The cap 2, supported by the supporting element 11, guided by the seat element 16 and by the side guide 24, is advanced along the transferring path T. Near the intermediate zone I, the cap 2 starts to interact below also with the supporting guide 25, and starts to be pushed radially outside the supporting element 11 by the respective transferring arm 13 that interacts with the cam profile 22. The cap 2 has a zone in contact with the supporting element 11, which decreases, whilst it has a further zone in contact with the supporting guide 25, which increases as the cap 2 approaches the delivery zone Q. From a given zone Z onwards, the cap 2 is separated from the supporting element 11 and slides entirely on the supporting guide 25, whilst it is moved by the respective seat element 16 and guided by the side guide 24. Once the cap 2 has reached the delivery zone Q, the cap 2 separates from the transferring arm 13 and from the side guide 24 and is removed by the conveyor belt 6. At this point, the transferring arm 13 starts to retract towards the rotation axis X1 to be ready to receive another cap 2 in the removing position P.

Owing to the configuration of the transferring arms 13 that are able to move the caps 2 also in a radial direction, it is not necessary to generate centrifugal actions on the caps 2 to remove the latter from the resting surface 12. That eliminates the need to provide a difference in level that facilitates the drop of the cap 2 on the conveyor belt 6. In other words, it is possible to have the supporting surface 26 at the same height as the upper surface of the conveyor belt 6 so as further to prevent undesired unbalancing of the caps 2 during the passage from the supporting guide 25 to the conveyor belt 6.

Possible versions and/or additions to what has been disclosed and illustrated above in the attached drawings are possible. For example, it is possible to provide configurations of the device to drive the transferring arms 13 that are different but equivalent to the driving device 20 disclosed above.

The invention claimed is:

1. Apparatus for transferring objects along a transferring path that extends from a removing zone to a delivery zone, comprising:
    an arm arrangement that is rotatable around a rotation axis and comprising seat elements that are suitable for receiving said objects, said arm arrangement being movable so as to vary the distance of said arm arrangement from said rotation axis;
    a supporting element that is rotatable around said rotation axis and is suitable for receiving said objects, said arm arrangement being movable so as to vary the distance of said arm arrangement from said rotation axis to move said objects with respect to said supporting element; and
    a lateral guide element extending around said supporting element along at least part of said transferring path and cooperating with the seat elements and with the supporting element to guide the objects laterally during transferring from the removing zone to the delivery zone.

2. Apparatus according to claim 1, wherein said arm arrangement is drivable so as to project said seat elements beyond an edge peripherally bounding said supporting element.

3. Apparatus according to claim 1, and further comprising a supporting guide element, that is contiguous to said supporting element, and is suitable for restingly receiving said objects.

4. Apparatus according to claim 3, wherein said supporting guide element partially surrounds said supporting element along at least part of said transferring path, said transferring path extending from said removing zone, wherein said objects are removed from said apparatus, to said delivery zone, and further wherein said objects are surrendered by said apparatus to an evacuating device.

5. Apparatus according to claim 3, wherein said supporting guide element has a dimension, measured in a radial direction with respect to said rotation axis, that from a determined value near an intermediate zone of said transferring path increases progressively towards said delivery zone.

6. Apparatus according to claim 3, wherein said supporting guide element lies substantially on a plane defined by said supporting element.

7. Apparatus according to claim 1, wherein said lateral guide element extends around said supporting element from a region near the removing zone to a further region near the delivery zone.

8. Apparatus according to claim 7, wherein said lateral guide element is at a distance from said supporting element, measured radially with respect to said rotation axis, that increases, along at least a fraction of said transferring path, from a first value to a second value.

9. Apparatus according to claim 8, wherein said lateral guide element is at a distance from said supporting element equal to said second value near said delivery zone.

10. Apparatus according to claim 1, wherein said arm arrangement is drivable by means of a driving device comprising a cam element cooperating with a roller element.

11. Apparatus according to claim 1, wherein said arm arrangement comprises a plurality of transferring arms that are movable radially with respect to said rotation axis, each transferring arm being provided at one end with a respective seat element.

12. Apparatus according to claim 11, wherein said seat element is configured for receiving side portions of a respective object.

13. Apparatus according to claim 1, wherein removing and supplying elements are connected with said supporting element to remove doses of plastics from an extruding device and to supply with said doses a die of a moulding carousel for compression-moulding said objects.

14. Apparatus according to claim 13, wherein said removing and supplying elements project opposite a resting surface of said supporting element that is suitable for restingly receiving said objects to be transferred.

15. A machine comprising an apparatus according to claim 1, and a moulding carousel for compression-moulding plastics for obtaining said objects.

\* \* \* \* \*